United States Patent
Shetty et al.

(10) Patent No.: US 9,723,314 B2
(45) Date of Patent: Aug. 1, 2017

(54) FLICKER REDUCTION CIRCUIT AND METHOD FOR COMPRESSED VIDEO TRANSMISSION

(75) Inventors: Santosh Shetty, Cedar Park, TX (US); Shih-chung Chao, Austin, TX (US)

(73) Assignee: SMSC Holdings SARL, Grand-Duchy of Luxembourg (LU)

( * ) Notice: Subject to any disclaimer, the term of this patent is extended or adjusted under 35 U.S.C. 154(b) by 1404 days.

(21) Appl. No.: 13/408,431

(22) Filed: Feb. 29, 2012

(65) Prior Publication Data

US 2013/0223515 A1    Aug. 29, 2013

(51) Int. Cl.
H04N 19/152    (2014.01)
H04N 19/107    (2014.01)
H04N 19/124    (2014.01)

(52) U.S. Cl.
CPC ......... *H04N 19/152* (2014.11); *H04N 19/107* (2014.11); *H04N 19/124* (2014.11)

(58) Field of Classification Search
CPC ......... H04N 19/00193; H04N 19/0009; H04N 19/0003; H04N 7/26026; H04N 7/26079; H04N 7/50; H04N 7/26244; H04N 7/26212
See application file for complete search history.

(56) References Cited

U.S. PATENT DOCUMENTS

| | | | |
|---|---|---|---|
| 5,038,209 A * | 8/1991 | Hang | 375/240.05 |
| 5,457,496 A * | 10/1995 | Hamano et al. | 375/240.16 |
| 5,913,031 A * | 6/1999 | Blanchard | 709/204 |
| 6,256,420 B1 * | 7/2001 | Sako et al. | 382/239 |
| 6,956,971 B1 * | 10/2005 | Cho et al. | 382/236 |
| 2001/0001614 A1 * | 5/2001 | Boice et al. | 375/240.24 |
| 2003/0133169 A1 * | 7/2003 | Uchibayashi et al. | 358/426.07 |
| 2003/0163209 A1 * | 8/2003 | Fukuhara et al. | 700/55 |
| 2004/0101051 A1 * | 5/2004 | Ishii | 375/240.13 |

(Continued)

FOREIGN PATENT DOCUMENTS

EP    1845735    10/2007

OTHER PUBLICATIONS

"Rate Control and H.264," © 2003-2009 PixelTools, 5 pages.
International Search Report & Written Opinion, PCT/US2013/025561, mailed May 7, 2013.

*Primary Examiner* — Mohammed Jebari
(74) *Attorney, Agent, or Firm* — Matheson Keys Daffer & Kordzik PLLC

(57) ABSTRACT

A system, circuit and method are provided herein for reducing perceived flicker in video images transmitted using compression and bit rate control. According to one embodiment of the method, a parameter used in the video compression scheme is stored. The parameter stored is one that is subject to adjustment during normal operation of the video compression scheme. Compressed video frame data issued by a compression encoder is used to test for a still-picture condition. When a still-picture condition is detected, the value of the parameter used by the video compression scheme is fixed to the stored value for the duration of the still-picture condition. An embodiment of the system includes an encoder, buffer, bit rate controller, and flicker reduction circuit. An embodiment of the flicker reduction circuit includes a still-picture detection circuit operably coupled to a compressed data path beginning at the output of the encoder.

16 Claims, 13 Drawing Sheets

(56) References Cited

U.S. PATENT DOCUMENTS

2008/0025397 A1    1/2008  Zhao et al.
2008/0101465 A1*  5/2008  Chono et al. ............ 375/240.03
2009/0046092 A1    2/2009  Sato et al.
2009/0168878 A1    7/2009  Kawashima

* cited by examiner

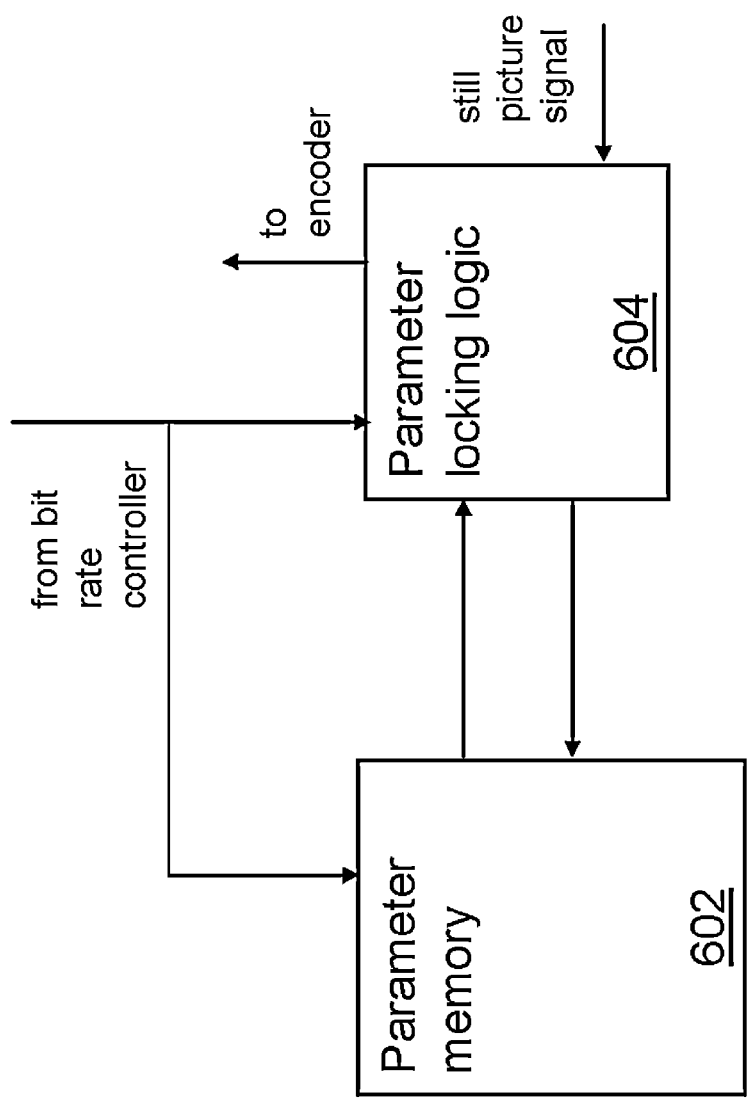

FLICKER REDUCTION CIRCUIT AND METHOD FOR COMPRESSED VIDEO TRANSMISSION

BACKGROUND OF THE INVENTION

1. Field of the Invention

This invention relates to a communications system for transmission of compressed video and, more particularly, to a circuit, communications system and method for reducing visible flicker in transmitted images.

2. Description of the Related Art

A communications system is generally well known as containing at least two nodes interconnected by a transmission line. The transmission line can either be a copper wire, optical fiber, or a wireless transmission medium. In many cases, the transmission line is within a network, which can include wire or cable links, wireless links, or a combination of these.

To allow large amounts of data to be transmitted at reasonable speeds, many communications systems employ data compression. Compression reduces the number of information bits used to represent a data file, so that transmission of the file is faster, less of a burden on the network, or both. The data is compressed by an encoder (encoded using a compression scheme) prior to transmission. After passing across the network, the compressed data is converted by a decoder back to an uncompressed form for further use or presentation. The encoder and decoder are often implemented as "codecs" on each end, where the codec can either compress or decompress the data stream.

Depending upon the particular compression scheme employed, the codec on the receiving end may not be able to fully restore the compressed data to its original uncompressed state. Some compression schemes are "lossy," meaning that some information is irreversibly discarded by the encoder during the compression process. When a lossy compression scheme is used for transmission over a network, the amount of information discarded is often adjusted as a means of controlling the bit rate of the transmission. In the case of video images, for example, the density of bits needed to represent the video is lower when the image is spatially simple or moves slowly, and higher for more complex or fast-moving images.

Video compression encoders typically compress one "block" of digital image data at a time, where a block contains the data corresponding to either a 4×4 or 16×16 array of displayed pixels. The 16×16 sized block is also referred to as a "macroblock." Because of the above-described variation in bit density with image complexity, an encoder moving through blocks of image data will output more bits per block, or a higher bit rate, for complex video portions than for simpler portions. Network and buffer requirements typically demand a relatively constant bit rate for transmission, however, necessitating use of a bit rate controller.

The effect of a bit rate controller may be more clearly understood in view of a simplified discussion of encoder operation. Three fundamental processes involved in many video compression encoding schemes are illustrated in FIG. 1. Digitized video frame block 102 in FIG. 1 represents the input to an encoder. Although the input data 102 is a stream of digital data, block 104 is shown as an example of what a block of video data might look like as displayed. Block 104 is shown as a 4×4 array of pixels for simplicity, but could also be a 16×16 macroblock, or any other size conveniently handled by a compression encoder. Input data 102 initially undergoes prediction process 106. The goal of prediction is to minimize the entropy for the transform process.

The prediction block, illustrated by block 108 in FIG. 1, derived from the best prediction mode, may be generated in different ways, depending on the prediction method used. In a method known as "inter prediction," prediction block 108 is derived from a corresponding block in a different frame of video than the frame containing block 104. In "intra prediction", prediction block 108 is instead derived from one or more blocks in the same frame as block 104. Commonly used prediction modes are: vertical, horizontal, DC (mean or average) and plane prediction. The plane prediction mode, for example, uses a linear function between the neighboring samples to the left and to the top in order to predict the current samples. Each prediction mode is assigned a uniquely identifiable code by the video compression standard, and the encoder and the decoder can reconstruct the same predicted pixel values given the prediction mode and the neighboring pixel samples.

Prediction block 108 is a 4×4 (or 16×16) approximation of the same area in the original picture. The value of each pixel in the prediction block may not match the original pixel value perfectly, but one prediction mode is chosen among all possible modes so that the overall difference between the prediction block and the original block is most beneficial to the rest of the encoding process. Prediction block 108 is subtracted from block 104. The result of the subtraction is called a residual block, illustrated as block 110 in FIG. 1. The digitized residual block is forwarded to the next stage of the encoder.

The next fundamental process in the encoder is transformation process 112. A mathematical transformation is used to represent the residual block as a combination of known basis patterns using a set of weighting coefficients. In the illustration of FIG. 1, residual block 110 could be represented as a sum of N basis patterns 114, each weighted by a corresponding coefficient C. The number N of basis patterns and the particular basis patterns used may vary depending on the block size and on the specific transform employed. The particular set of coefficients 116 used in the transform of the residual block being processed then undergoes quantization process 118.

In quantization process 118, the coefficients 116 are divided by an integer related to a quantization parameter $Q_P$. The coefficients are either truncated toward zero or rounded to the nearest integer after division, so that the effect of the quantization is generally to make more of the coefficients go to zero. This loss of coefficients represents a loss of image data that cannot be recovered in the decoding process. The specific relationship between $Q_P$ and the quantization step depends on the particular compression scheme, but in general larger values of $Q_P$ result in more data lost. A bit rate controller can therefore adjust the value of $Q_P$ used by the encoder in order to control the bit rate of the encoder output. A higher $Q_P$ reduces the bit rate of data from the encoder, which may keep the transmission within the bandwidth requirements of the network, but at the cost of more lost data and a lower image quality.

In further processing not shown in FIG. 1, the coefficients resulting from quantization process 118, along with other information describing the compression process, are coded into an efficient transmission format and output to a buffer. The data stream is then fed from the buffer to a network interface for transmission.

In many cases, the image quality reduction caused by a lossy compression scheme as described above is minimally perceptible to a viewer, if perceptible at all. This is particularly the case for data lost during bit rate control of frames containing rapidly-moving images. One type of distortion is perceptible and bothersome, however. An annoying flicker can be observed in some cases, particularly in image regions with little or no motion.

Previous methods of addressing this flicker problem include a determination of whether flicker is likely to occur. The determination may be done on a block-by-block basis for a frame being processed using inter prediction, as described in U.S. Publication No. 2008/0025397, hereby incorporated by reference herein. A block-by-block investigation done within the encoder (i.e., between prediction process 106 and transform process 112 in FIG. 1) adds undesirable complexity to the encoding process, however. In addition, a flicker determination based on inter-predicted blocks cannot be used for those encoders that utilize only intra prediction.

Another previous method, described in U.S. Publication No. 2009/0046092, hereby incorporated by reference herein, determines the likelihood of flicker by a calculation at the pixel level of a complexity parameter of a reconstructed (noncompressed) image, followed by normalization with complexity data calculated for a previous frame. This calculation for a noncompressed image at the pixel level also adds undesirable computational complexity to the encoder, and relies on previous image data that may not be available to encoders using intra prediction only.

Upon determining that flicker is likely to occur, the previous approaches referenced above include a modification of the encoder's process for selecting a prediction mode. In U.S. Publication No. 2008/0025397, a cost function to be minimized as part of the prediction mode selection is modified to include a comparison of reconstructed blocks from the current frame and from the previous frame. Similarly, in U.S. Publication No. 2009/0046092 the prediction mode selection process is modified to favor use of previous frame and/or future frame image data. These previous approaches not only add complexity, but again rely on image data from different frames which may be unavailable to intra-prediction-only encoders.

It would be desirable to have a way of detecting video frames likely to exhibit flicker that does not add computational complexity to the encoder and does not require storage of reference image frames. It would further be desirable to have a way of mitigating perceived flicker that neither adds computational complexity to the encoder nor requires storing of reference image frames.

SUMMARY OF THE INVENTION

The problems outlined above are in large part solved by a method, system, and circuit as described herein.

A method for modifying a video compression scheme implemented by an encoder includes the step of storing a value of a parameter used in the video compression scheme, where the parameter is one that is subject to adjustment during normal operation of the video compression scheme. The method further includes the step of using compressed video frame data issued by the encoder to test for a still-picture condition. The still-picture condition is one in which successive compressed video frames portray a substantially unchanging image. When the still-picture condition is detected, the method includes the step of fixing the value of the parameter used in the video compression scheme to the stored value for the duration of the still-picture condition.

In one embodiment, the method may include the further step of using the compressed video data to test for an end of the still-picture condition, once the still picture condition is detected. When the end of the still-picture condition is detected, the method may also include releasing the value of the parameter used in the compression scheme, so that the parameter is again subject to adjustment through normal operation of the compression scheme.

According to one embodiment, the step of using compressed video frame data includes using a compressed data buffer occupancy level. Such an embodiment may include detecting the peak buffer occupancy level during passage of a compressed video frame through a compressed data buffer. When the peak buffer occupancy level is detected, the still-picture condition may include a condition in which the variation in peak buffer occupancy level remains within a predetermined range throughout the passage of multiple compressed video frames through the buffer. In a further embodiment, the parameter used in the video compression scheme includes a quantization parameter corresponding to at least one block of a video frame. In such an embodiment, the step of storing a value of the parameter may include storing an array including the quantization parameter corresponding to each block of a video frame. When an array of quantization parameters is stored, storing a value of the parameter may further include storing, for each quantization parameter in the array, an indication of whether the quantization parameter for the corresponding block is to be fixed during the still-picture condition.

In some embodiments of the method, the parameter used in the video compression scheme includes a quantization parameter corresponding to at least one block of a video frame. In such embodiments, the step of fixing the value of the parameter may include sending the stored value of the quantization parameter to the encoder implementing the compression scheme. This stored value is sent in place of the value of the quantization parameter most recently determined by a bit rate controller associated with the encoder. In other embodiments, the parameter used in the video prediction scheme may include a prediction mode corresponding to at least one block of a video frame. In such an embodiment, the step of storing a value of the parameter may include storing an array including an indicator of the prediction mode corresponding to each block of a video frame.

A system for transmitting compressed video data over a network includes an encoder adapted to compress the video data, a buffer operably coupled between the encoder and a network interface, a bit rate controller operably coupled to the encoder and adapted to maintain a substantially constant bit rate for transmission of the compressed video data, and a still-picture detection circuit operably coupled to the compressed data path which begins at the output of the encoder and extends onto the network. The buffer is adapted to receive the compressed video data from the encoder and make the data available to the network interface for transmission over the network.

According to one embodiment, the still-picture detection circuit includes a peak buffer level detection circuit and a buffer peak comparison circuit. The peak buffer level detection circuit is adapted to detect the peak occupancy level of the buffer as one frame of compressed video data passes through the buffer. The buffer peak comparison circuit then determines whether the difference between peak occupancy levels for successive frames of compressed video is less than a predetermined amount. In a further embodiment, the system includes a parameter memory operatively coupled to the bit rate controller and parameter locking logic operatively coupled to the buffer peak comparison circuit, the parameter memory, and the encoder. The parameter locking logic is adapted to store in the parameter memory a quantization parameter value corresponding to at least one block of a video frame. In addition, the parameter locking logic is adapted to receive a signal from the buffer peak comparison circuit indicating a still-picture condition, if the buffer peak comparison circuit presents the signal. When the parameter locking logic receives the signal indicating a still-picture condition, it is adapted to send the stored quantization parameter value to the encoder in place of the quantization parameter value most recently generated by the bit rate controller.

The system for transmitting compressed video data over a network may include not only a still-picture detection circuit, but also a parameter locking circuit operably coupled to the encoder and the still-picture detection circuit. The parameter locking circuit is adapted to store a value of a parameter used by the encoder, where the parameter is one that is subject to adjustment arising from operation of the bit rate controller. The parameter locking circuit is further adapted to receive, if presented, a signal from the still-picture detection circuit indicating a still-picture condition. When a still-picture signal is received, the parameter locking circuit is further adapted to fix the value of the parameter used by the encoder to the stored value of the parameter for the duration of the still-picture condition.

A flicker reduction circuit for use with a video compression encoder includes a still-picture detection circuit adapted for coupling to a compressed data path, where the compressed data path extends from the output of the video compression encoder and onto a network used for transmission of the compressed video data. In an embodiment, the still picture detection circuit includes a peak buffer level detection circuit and a buffer peak comparison circuit. The peak buffer level detection circuit is adapted to detect the peak occupancy level of a buffer operably coupled between the output of the video compression encoder and the network. The peak occupancy level is detected for the period during which one frame of compressed video data passes through the buffer. The buffer peak comparison circuit is adapted to determine whether the difference between peak buffer occupancy levels for successive frames of compressed video is less than a predetermined amount.

The flicker reduction circuit may include not only a still-picture detection circuit, but also a parameter locking circuit operably coupled to the still picture detection circuit. The parameter locking circuit is adapted to store a value of a parameter used by the encoder, where the parameter is one that is subject to adjustment arising from operation of a bit rate controller associated with the encoder. The parameter locking circuit is further adapted to receive, if presented, a signal from the still-picture detection circuit indicating a still-picture condition, where a still picture condition is one in which successive compressed video frames portray a substantially unchanging image. When a still-picture signal is received, the parameter locking circuit is further adapted to fix the value of the parameter used by the encoder to the stored value of the parameter for the duration of the still-picture condition.

In a further embodiment, the parameter locking circuit includes a parameter memory and parameter locking logic. The parameter memory is adapted for coupling to the bit rate controller associated with the encoder. The parameter locking logic is operatively coupled to the still picture detection circuit and the parameter memory, and is adapted to store in the parameter memory a quantization parameter value corresponding to at least one block of a video frame. The parameter locking logic is further adapted to receive from the still-picture detection circuit a signal indicating a still-picture condition, if the still-picture detection circuit presents such a signal. When the still-picture signal is received, the parameter locking logic is configured to send the stored quantization parameter value to the encoder in place of a quantization parameter value most recently generated by the bit rate controller.

BRIEF DESCRIPTION OF THE DRAWINGS

Other objects and advantages of the invention will become apparent upon reading the following detailed description and upon reference to the accompanying drawings in which:

FIG. 6 is a block diagram of an embodiment of a parameter locking circuit;

Figure 1:
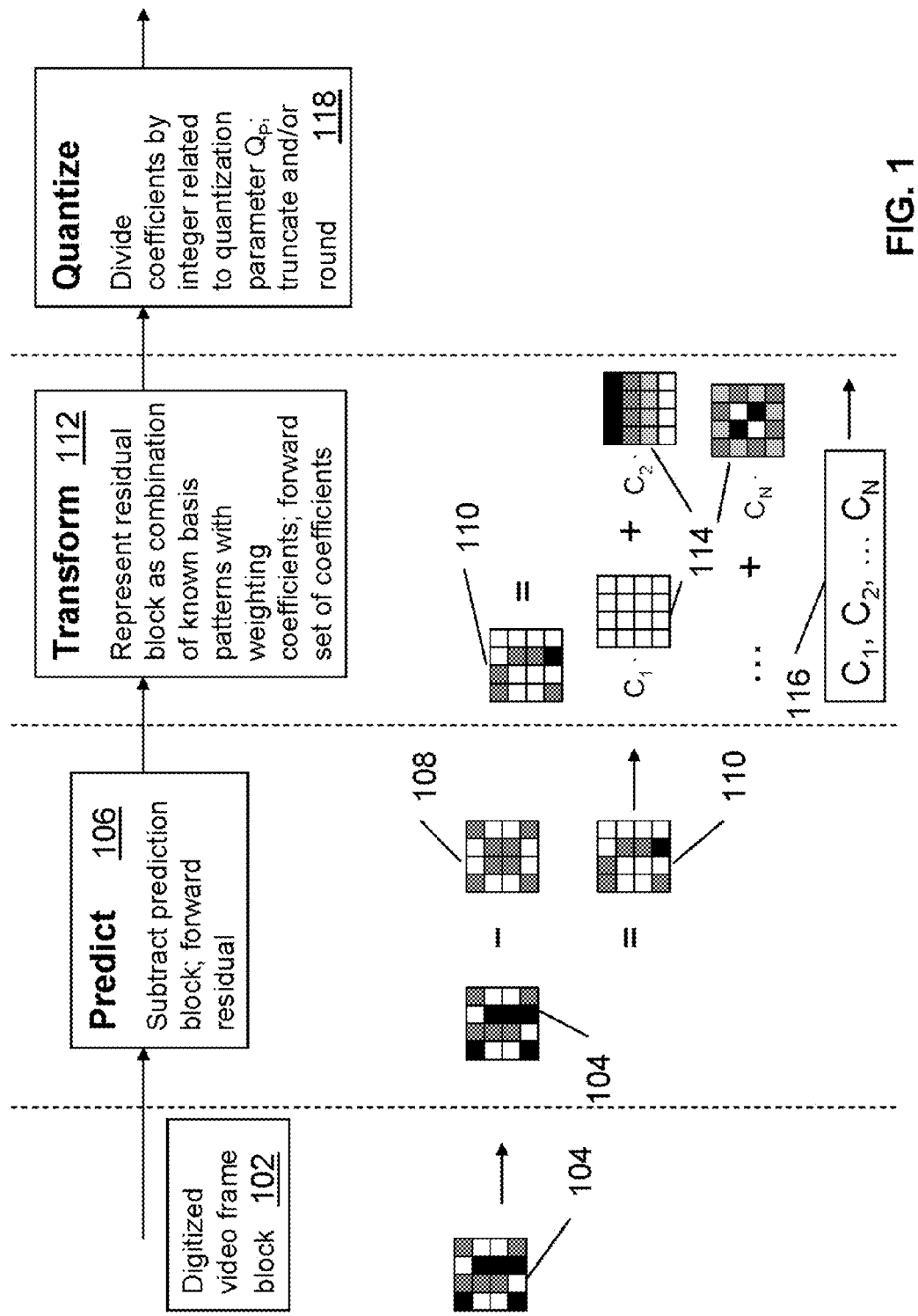
FIG. 1 is an illustration of some of the fundamental processes carried out by a typical video compression encoder.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 2:
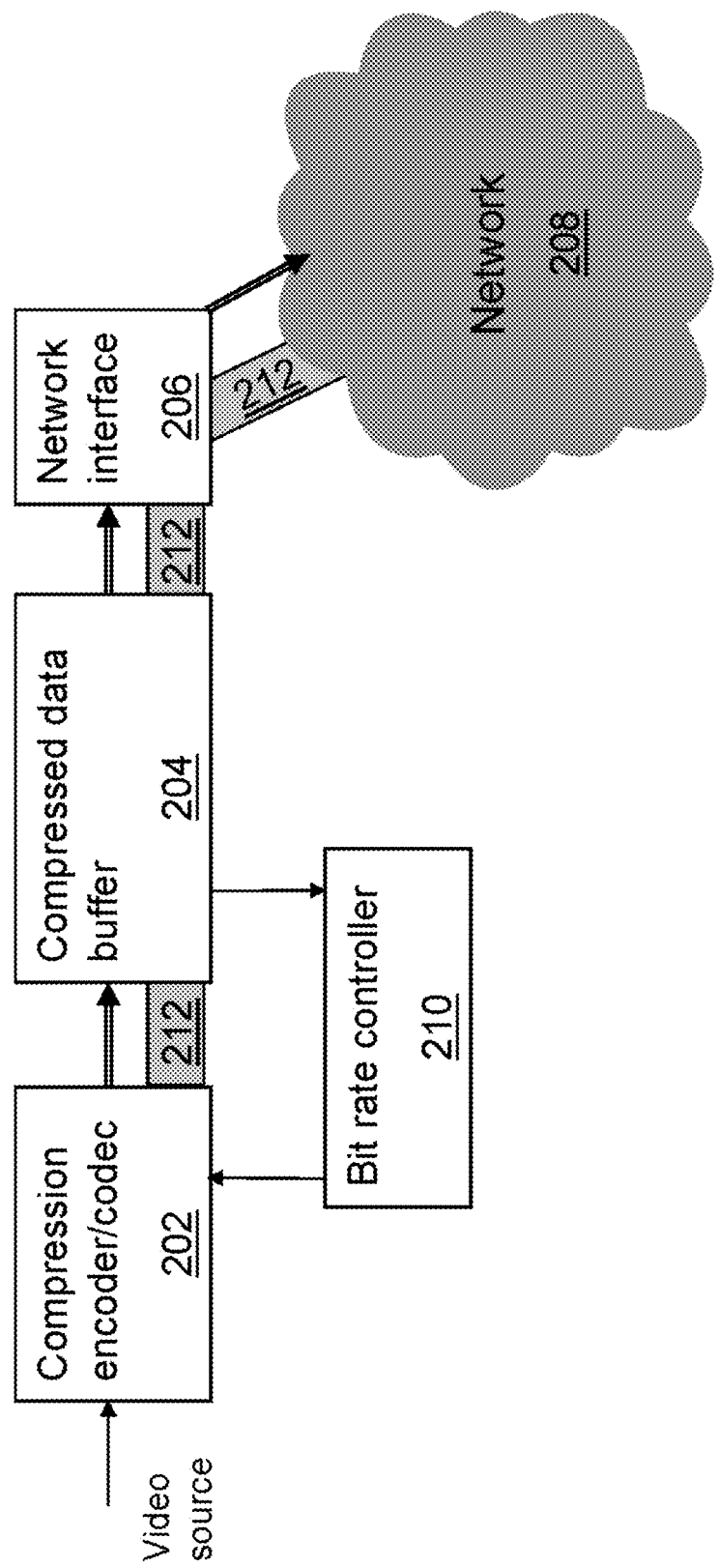
FIG. 2 is a block diagram of a typical video compression system for transmission over a network.

Turning now to the drawings, FIG. 1 illustrates processes carried out by a compression encoder and is discussed in the Description of the Related Art section above. FIG. 2 is a block diagram of a typical video compression system for transmission over a network. The source video is compressed using compression encoder/codec 202. Encoder/codec 202 may be an encoder or codec implementing any of multiple suitable compression encoding schemes, including H.264/AVC ("Advanced Video Coding"), H.263, H.261, MPEG1, MPEG2, and MPEG4. The method and system and circuit described herein are believed to be advantageous for any compression scheme employing quantization. The compressed data issued from the output of encoder/codec 202 goes into compressed data buffer 204, and then to network interface 206 for transmission across network 208.

Network interface 206 provides the appropriate commands and packet structure to send the compressed data over network 208. Network 208 may contain one transmission line between two nodes, or may include multiple interconnected nodes and be organized in various topologies, such as bus, ring, star, or tree topologies, or in combinations of these. The transmission line between nodes of network 208 may take any effective form, such as a wired, wireless, or fiber optic link. Network 208 may operate using any protocol for which a network interface 206 is available. In an embodiment, network 208 is a Media Oriented Systems Transport (MOST) network, and network interface 206 is a MOST network controller. In another embodiment, network 208 is the Internet, and network interface 206 is a TCP/IP network interface. In still another embodiment, network 208 is an Ethernet network, and network interface 206 is an Ethernet network interface. Also shown conceptually in FIG. 2 is compressed data path 212, which begins at the output of compression encoder/codec 202 and extends through buffer 204 and network interface 206 and onto network 208. The double-lined arrows between encoder/decoder 202, buffer 204, network interface 206 and network 208 also indicate the compressed data path.

For many network communication applications, transmission at a relatively constant bit rate is the goal (as opposed to transmission at constant quality but variable rate). For constant-rate operation, it is typically desirable to keep the bit rate below, but close to, the limit imposed by network bandwidth. To this end, bit rate controller 210 dynamically adjusts the encoding process, typically through adjustment of the quantization parameter $Q_P$, in order to maintain a relatively constant rate of bits supplied by the controller. In the embodiment of FIG. 2, bit rate controller 210 receives buffer occupancy information from buffer 204 as an indicator of whether the bit rate from encoder/codec 202 is too high. If the bit rate is too high, controller 210 increases the quantization parameter $Q_P$ that it sends to encoder 202, causing the encoder to discard more information during the quantization process.

Figure 3:
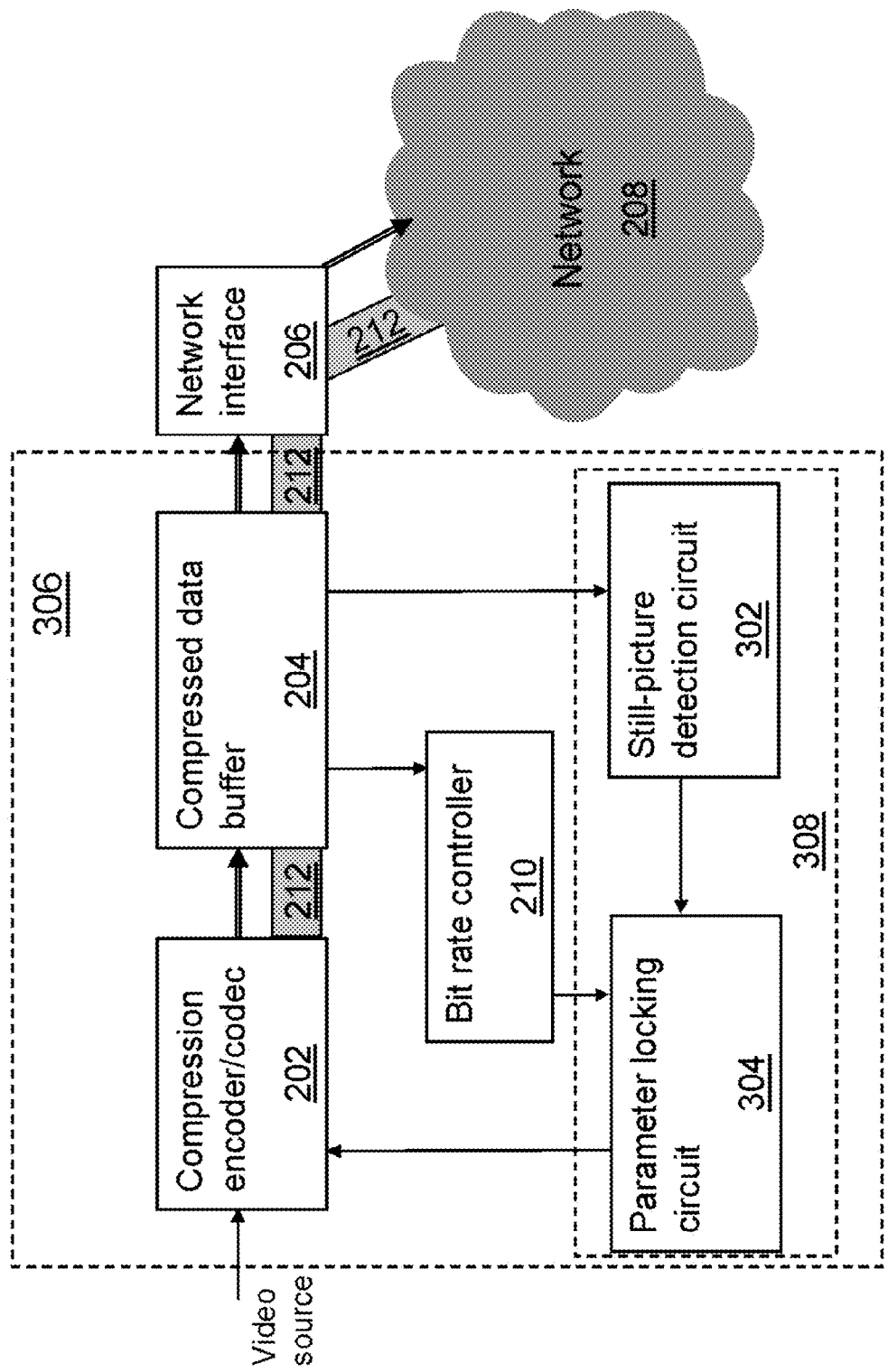
FIG. 3 is a block diagram of an embodiment of a system for compressing video data.

A block diagram of an embodiment of a video compression system including additional circuitry for flicker control is shown in FIG. 3. System 306 includes encoder/codec 202, compressed data buffer 204, and bit rate controller 210, as also shown in FIG. 2. Also included in system 306 in this embodiment is flicker reduction circuit 308. Flicker reduction circuit 308 includes still-picture detection circuit 302 and parameter locking circuit 304. In the embodiment of FIG. 3, still-picture detection circuit 302 is coupled to compressed data buffer 204, as shown by the arrow between these elements of the block diagram. Specifically, still-picture detection circuit 302 may obtain data from buffer 204 indicating the buffer occupancy level. In other embodiments, however, still-picture detection circuit 302 could be coupled at another point along compressed data path 212.

Still-picture detection circuit 302 is also coupled to parameter locking circuit 304 in the embodiment of FIG. 3, as indicated by the arrow between these elements of the block diagram. Specifically, still-picture detection circuit 302 may provide parameter-locking circuit 304 with a signal indicating a still-picture condition, or a condition in which the compressed video frames moving through system 306 portray a substantially unchanging image. In other words, during a still-picture condition the video frames, when decompressed by a decoder after transmission and displayed, will portray a substantially unchanging image. By "substantially unchanging image," it is meant a video sequence in which the differences between subsequent frames are confined to a small fraction of the frame. For example, a view of a single presentation slide would be a still-picture condition, as would a view of a computer screen in which the only movement from one frame to the next is from small features such as a blinking cursor or a changed time on a clock display. Similarly, views of a navigation map in which the only change from frame to frame was slight movement of a car's position, or in which the overall scene continued to look very similar despite movement (such as travel on a single road with few nearby roads or features), could also provide a still-picture condition. Another example would be a mainly static web browser page with movement confined to one or more small banner advertisements in windows at the margins.

Parameter locking circuit 304 of system 306 is interposed between bit rate controller 210 and encoder/codec 202. Parameter locking circuit 304, in the event it receives an indication of a still-picture condition, suspends the usual control of encoder 202 through bit rate controller 210, instead holding fixed, for the duration of the still-picture condition, a parameter used by encoder 202. As discussed further below, the parameter held fixed by parameter locking circuit 304 may be a quantization parameter.

Figure 4:
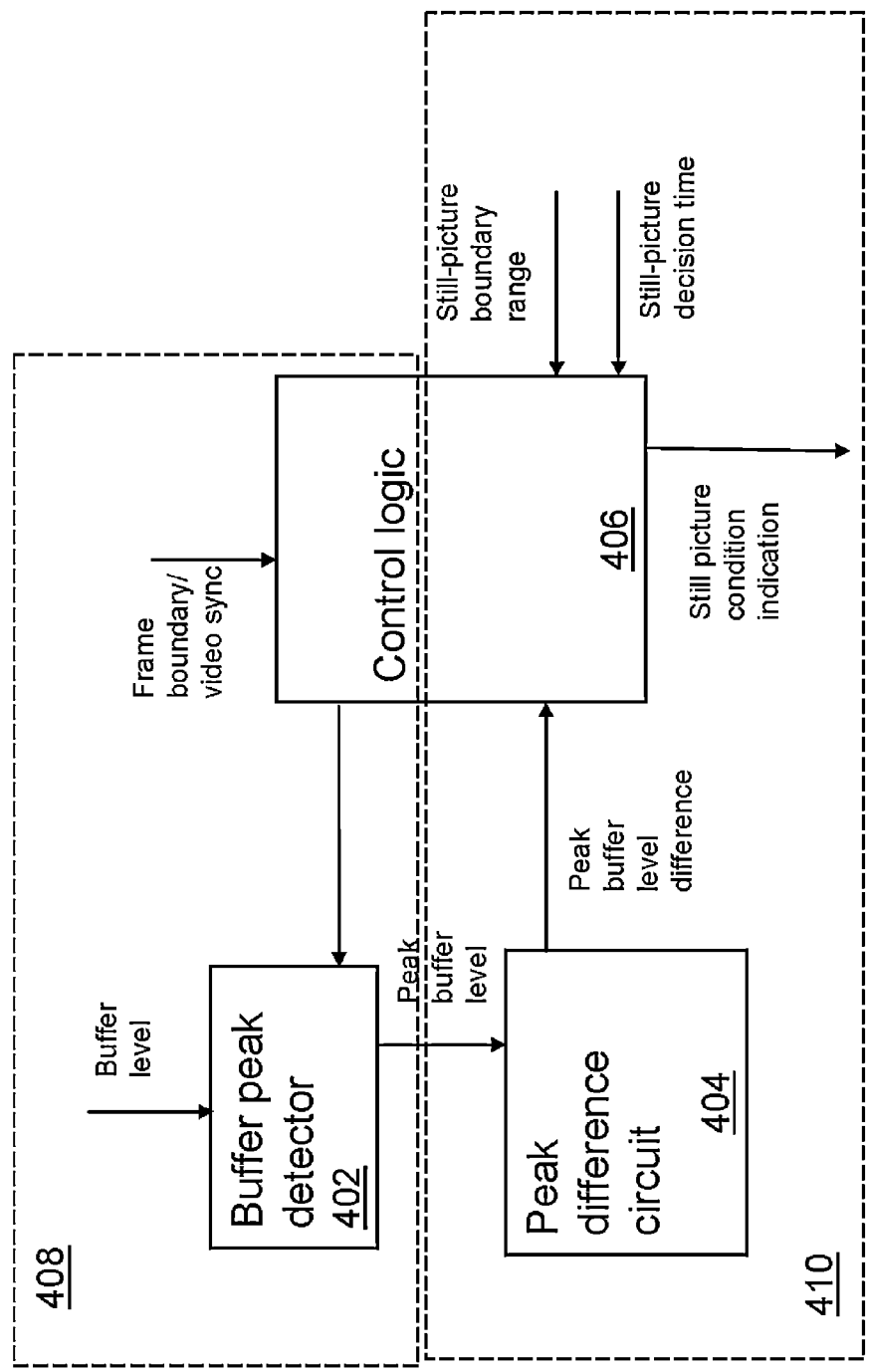
FIG. 4 is a block diagram of an embodiment of a still-picture detection circuit.
Figure 5A:
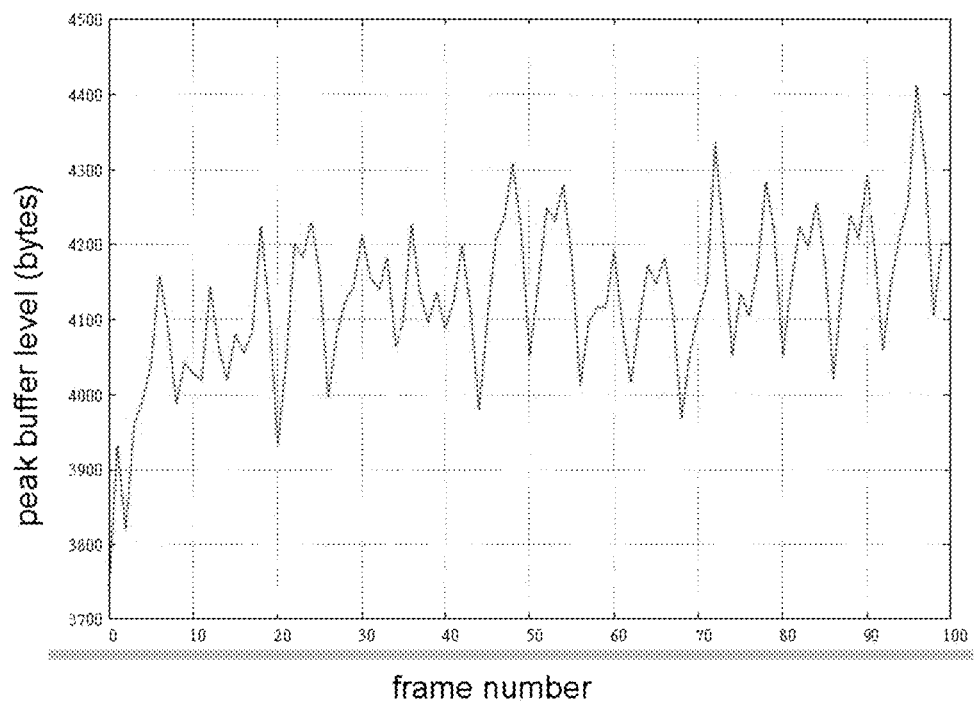
FIGS. 5A through 5D are plots illustrating the mechanism underlying an embodiment of a still-picture detection circuit.
Figure 5B:
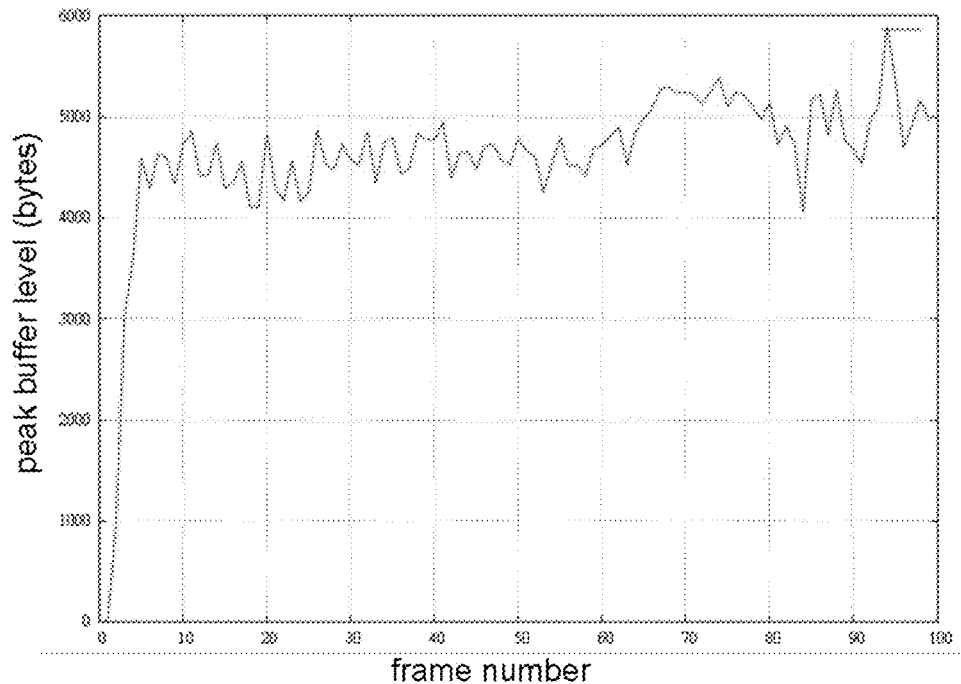
Figure 5C:
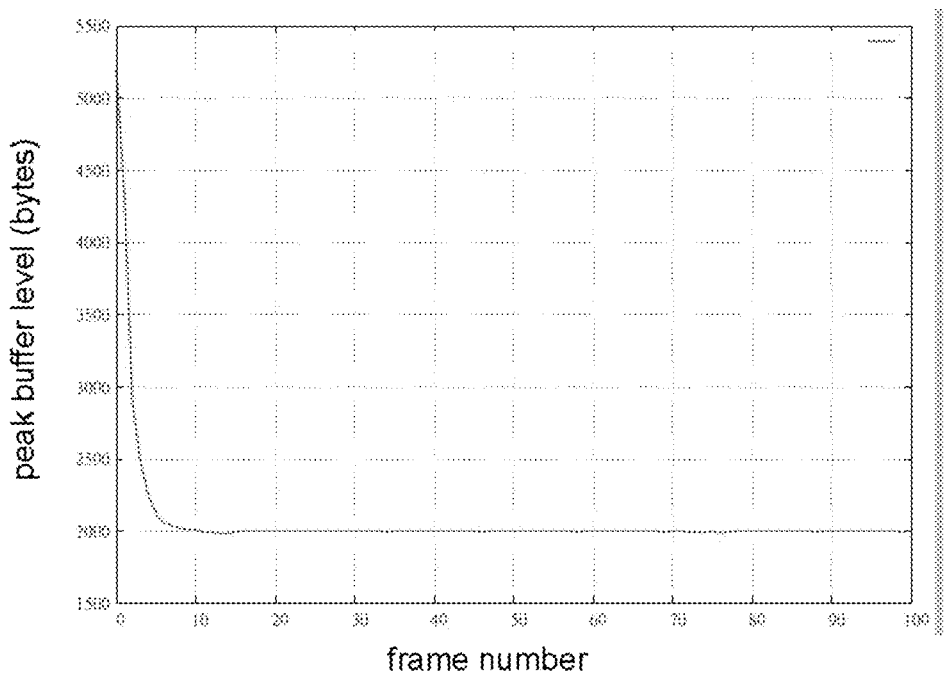
Figure 5D:
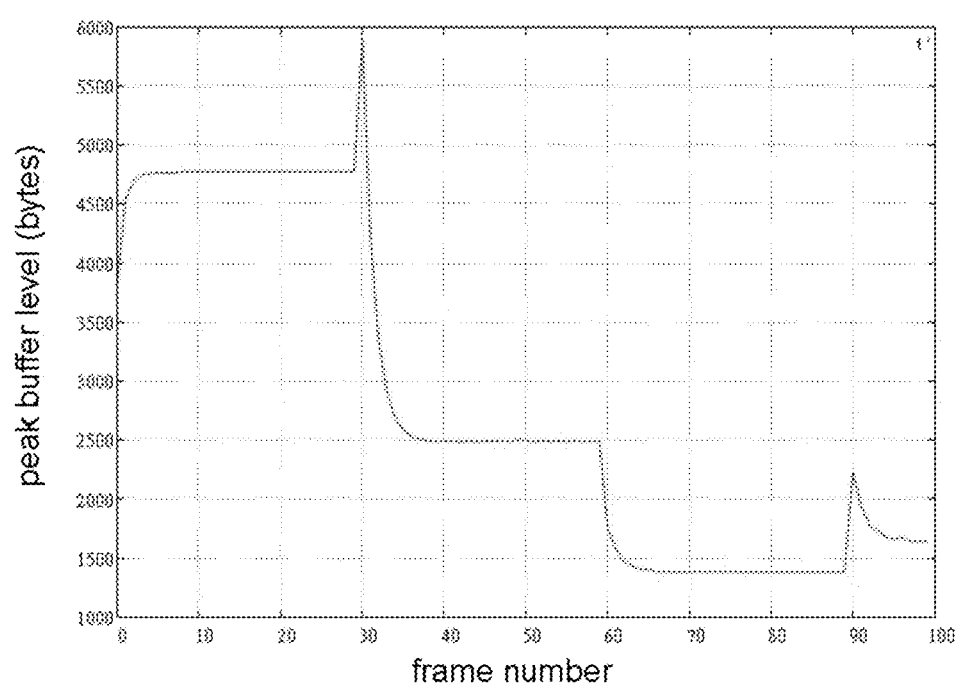

A block diagram of an embodiment of still-picture detection circuit 302 is shown in FIG. 4. In the embodiment of FIG. 4, still-picture detection circuit 302 can be divided into two main functional subcircuits: peak buffer level detection circuit 408 and buffer peak comparison circuit 410. Peak buffer level detection circuit 408 includes buffer peak detector 402 and a portion of control logic 406. Control logic 406 receives a frame boundary, or video sync, signal from the encoder indicating the start and end of each frame of compressed video data passing through the buffer. This signal is used by buffer peak detector 402 to determine the peak (maximum) buffer occupancy level for each frame of compressed data passing through the buffer. Buffer peak detector 402 receives the instantaneous buffer occupancy level from buffer 204 (shown in FIGS. 2 and 3), and determines the peak buffer level reached during the current video frame. In an embodiment, buffer peak detector 402 obtains write and read pointer addresses from buffer 204, and subtracts these addresses to obtain the buffer occupancy level. In a preferred embodiment, the buffer occupancy level is stored, and repeatedly tested during the period between subsequent frame boundary signals to determine whether the buffer level has increased. If the buffer occupancy level has increased, the new level is written over the existing stored level, so that the stored buffer level at the time a frame boundary signal is received corresponds to the peak buffer occupancy level of the frame that just ended.

This peak buffer occupancy level is stored in a separate location after it is determined, preferably by overwriting a stored peak value for the previous frame to minimize the memory space required. Therefore, once the first frame has been processed, a stored value of the peak buffer level for the previous frame is available at the time the peak buffer level for a new frame is determined. These present and previous values of the peak buffer occupancy level are used by buffer peak comparison circuit 410.

Buffer peak comparison circuit 410 includes peak difference circuit 404 and a portion of control logic 406. Peak difference circuit 404 receives the peak buffer level determined for the current video frame, and subtracts the previously-stored peak buffer level for the previous frame, to obtain a peak buffer level difference between the two frames.

The control logic compares this difference to a predetermined threshold value, or boundary range, where the threshold value is preferably defined by a user of the circuit. If the difference between the peak buffer levels of the adjacent frames is less than the threshold value, a still-picture condition is indicated. In an embodiment, the threshold value is in units of bytes stored in the buffer. The appropriate threshold range may depend on multiple variables affecting the rate of compressed data flowing into the buffer and the rate at which data is removed for transmission over the network. In some embodiments, the appropriate threshold range is less than 256 bytes.

Before activating a still-picture indicator signal, control logic 406 may ensure that a still-picture decision time has elapsed. This delay helps to ensure that the bit rate output by the encoder for the current (substantially unchanging) image has stabilized before proceeding with a flicker-reduction process that temporarily defeats the normal bit rate control mechanism. The still-picture decision time is preferably defined by a user of the circuit, and is preferably set to at least the reciprocal of the loop bandwidth of the bit rate controller. More preferably, the still-picture decision time would be set to at least twice the reciprocal of the loop bandwidth of the bit rate controller. In an embodiment, the still-picture decision time is defined as a number of consecutive video frames for which the peak buffer level variation remains below the threshold value.

The still-picture decision time is preferably set by the user of the circuit such that the observed flicker in the decoded video image is minimized. If the still-picture decision time is set too long, an initial flicker may be observable before the parameter locking circuitry (described further below) acts to remove the flicker. On the other hand, if the decision time is set too short, the parameter locking may result in a bit rate that is too high or too low compared to the rate of bit removal from the buffer. In this case the peak buffer level will change significantly and end the still-picture condition, as described further below. Moving in and out of the still-picture condition will generally result in changes in quantization and/or prediction mode that will themselves cause flicker. It is therefore desirable to set the still-picture decision time to the shortest time (or lowest number of frames) that will allow the bit rate controller to stabilize before activation of the parameter locking circuitry. This value may depend upon multiple variables affecting the stability and response of the system. In some embodiments an appropriate decision time is approximately 100 frames or less, or about 1.5 seconds or less, for a standard 60 frames/second frame display rate.

When both the low buffer peak variation condition and the decision time condition are met, control logic 406 activates a still picture indication signal. This signal is provided to a parameter locking circuit such as circuit 304 of FIG. 3. In an embodiment, the still-picture indication signal is simply a stored "true" value, with "false" corresponding to lack of a still-picture condition. In a further embodiment, the still-picture indication may be a digital "1" stored in a single bit of a memory location.

It was discovered through experimentation that the variation in peak buffer occupancy from one frame to the next gives an effective indication of whether a still-picture condition exists. This method is believed to be effective for systems designed to transmit at a constant rate. In such systems, the network drains compressed data from the buffer at a constant rate, and in the case of a still picture the action of the encoder and the bit rate controller should feed a similar number of compressed data bits to the buffer for each consecutive frame. Therefore, although the buffer level may vary within the duration of each (near-identical) still-picture frame, the time variation of the buffer level for each frame, and therefore the peak buffer level for each frame, should be nearly the same during a still-picture condition.

The data plots shown in FIG. 5 confirm that the variation in peak buffer level from one frame to the next provides a good indicator of a still-picture condition. The plots of FIG. 5 were generated by a software simulation of an H.264 encoder and compressed data buffer applied to various moving and still images. Each graph in FIG. 5 plots the peak buffer level in bytes at the end of each frame against the number of frames. FIGS. 5A and 5B are plots for moving images, and show rapid variations in the peak buffer level from frame to frame. FIG. 5C is a plot for a still image, showing that after an initial transient the variation in peak buffer level is almost imperceptible, on the order of 10 to 20 bytes or less for this example. The plot of FIG. 5D is for a slideshow of still images. Although the value of the peak buffer level depends on the particular image within the slideshow, the variation of peak buffer level is again very small for each still image after an initial transient. For a video compression system like the one generating the plots of FIG. 5, a suitable still-picture boundary range for use by buffer peak comparison circuit 410 of FIG. 4 may be approximately 20 bytes. Based on the transients in FIGS. 5(*c*) and 5(*d*), a suitable still-picture decision time, for use by circuit 410 once the variation in peak buffer level falls within the boundary range, may be the time for approximately 5 to 10 frames to pass through the buffer.

Use of the peak buffer level to detect a still-picture condition is extremely efficient since only two quantities—peak buffer level and difference between current and previous peak buffer level—are determined and stored for an entire frame. This is much simpler than previous methods involving a block-by-block or even pixel-by-pixel determination, along with storage of image data from previous frames. The still-picture detection circuit of FIG. 4 also keeps the still-picture detection outside of the encoder, so that no additional complexity is added to the already computationally-intensive encoding process. Finally, the circuit of FIG. 4 requires no use of image data from previous frames, so that it can be used in systems that employ intra prediction only and store no reference images.

Although the embodiment shown in FIG. 4 of still-picture detection circuit 302 uses the buffer level to detect a still-picture condition, other metrics associated with compressed data path 212 may also be suitable indicators of a still-picture condition. For example, a metric associated with traffic along data path 212 or on network 208 could reflect the presence of a still-picture condition. In such an embodiment, still-picture detection circuit 302 could be coupled to network interface 206 rather than compressed data buffer 204, or to a hardware or software-based network monitor anywhere along compressed data path 212. Coupling of the still-picture detection circuit at any point along compressed data path 212 retains the advantages of keeping the still-picture detection external to the encoder and the details of the prediction process.

As shown in FIG. 3, when still-picture detection circuit 302 activates a still-picture indicator signal, the signal goes to parameter locking circuit 304. In an embodiment, still-picture detection circuit 302 may activate the signal by setting a bit that is then detected by parameter locking circuit 304. A block diagram of an embodiment of parameter locking circuit 304 is shown in FIG. 6. Parameter locking circuit 304 includes parameter memory 602 and parameter locking logic 604. Parameter locking logic 604 causes a parameter used by the encoder to be stored in parameter memory 602. In an embodiment, the parameter is a parameter subject to adjustment arising from operation of the bit rate controller. In a preferred embodiment, the parameter is a quantization parameter ($Q_P$) adjusted by the bit rate controller. Preferably, the $Q_P$ value for every control unit used by the bit rate controller is stored in parameter memory 602. The control unit for the bit rate controller, as for the encoder, is typically a block or macroblock, although other control units such as a slice containing one or more macroblocks might be used as well. In a preferred embodiment, parameter memory 602 is relatively small compared to the memory needed to store a full source video frame. This is sufficient since there are typically many fewer control units than there are pixels in a frame. In an embodiment, parameter memory 602 is large enough to hold the $Q_P$ values for one frame, so that the values are overwritten as they are generated by the bit rate controller for each successive frame.

In other embodiments, the parameter stored in parameter memory 602 could be a different parameter, such as an indicator of the prediction mode used in encoder/codec 202 for each control unit of a video frame. The prediction mode is believed to be adjusted in part through the operation of the bit rate controller, through the influence of $Q_P$ on prediction mode. In an embodiment storing an indicator of the prediction mode, an indicator of the prediction mode would be sent from encoder 202 to parameter locking logic 604, rather than from bit rate controller 210. Because some variation in prediction mode may occur independent of the quantization parameter, storing and locking of the prediction mode in addition to the quantization parameter may remove a residual flicker not addressed by storing and locking of the quantization parameter alone.

As the set of parameter values is repeatedly stored in parameter memory 602, parameter locking logic 604 checks for the presence of a still picture indicator signal from still picture detection circuit 302. In an embodiment, the still picture indicator signal is sent by buffer peak comparison circuit 410 within still picture detection circuit 302. When the still picture indicator signal is activated, parameter locking logic 604 sends the stored parameter values from parameter memory 602 to encoder 202, in place of the dynamically-adjusted values normally used by the encoder. In an embodiment in which the quantization parameter $Q_P$ for each block or macroblock is stored in parameter memory 602, the stored $Q_P$ values are sent to encoder 602 in place of the $Q_P$ values that the bit rate controller continues to dynamically generate. Parameter locking logic 604 also halts storing of parameter values for subsequent frames once the still-picture indication signal is received. In this way, the stored parameter values at the time the still-picture condition begins are "locked" for the duration of the still-picture condition. When parameter locking logic 604 detects a deactivation of the still-picture indicator signal, it stops sending the stored parameter values to the encoder and restores the provision of the dynamically-adjusted parameter values normally used by the encoder.

Through the operation described above, parameter locking circuit 304 essentially suspends the application of bit rate control to the operation of encoder/codec 202 for the duration of detected still-picture conditions. Hardware implementation of a video compression system using a flicker reduction circuit as described herein has substantially reduced, if not eliminated, observed flicker in still portions of images. The flicker is believed to be caused by variations in prediction mode and quantization for successive frames of substantially identical images. The circuits, methods, and systems described herein are believed to provide particularly simple and efficient elimination of flicker that is effective for systems using intra-only prediction. The described circuits, methods, and systems are also effective for more generalized prediction schemes including inter prediction.

Figure 7:
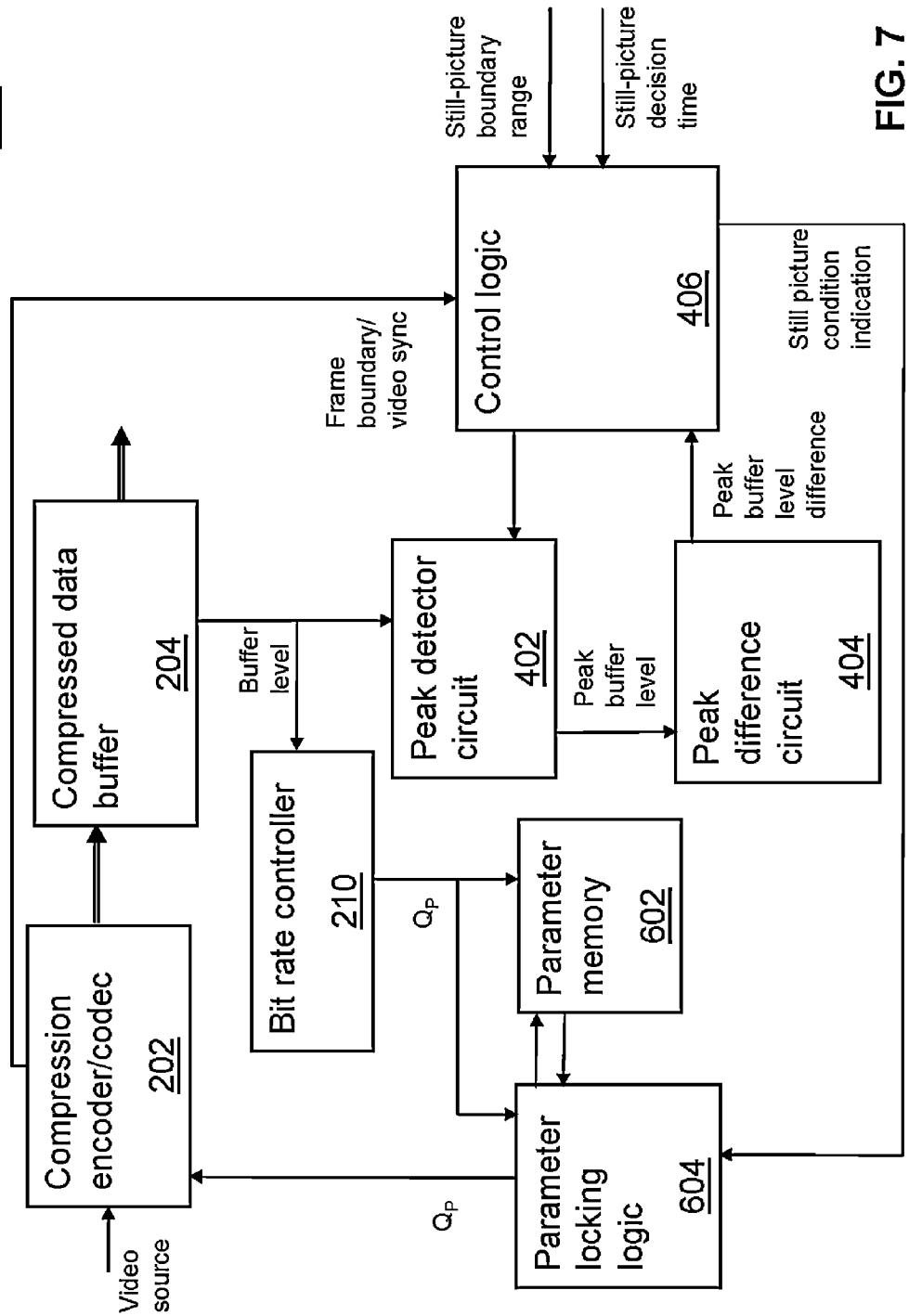
FIG. 7 is a block diagram of an additional embodiment of a system for compressing video data.

A block diagram of a system 702 combining embodiments of still picture detection circuit 302 and parameter locking circuit 304 is shown in FIG. 7. The dynamic occupancy level of compressed data buffer 204 is provided to bit rate controller 210, for use in its normal operation, and to peak detector circuit 402, for use in still picture detection. Peak detector circuit 402, peak difference circuit 404, and control logic 406 operate as described above for FIG. 4 to generate a still picture condition indicator signal in the event a still picture condition is detected. The still picture indicator signal is provided to parameter locking logic 604. In the embodiment of FIG. 7, parameter locking logic 604 operates to store quantization parameter $Q_P$ in parameter memory 602, and to provide the stored $Q_P$ values to encoder/codec 202 in the event of a still-picture condition. Compressed data buffer 204 is adapted for connection to a network interface and network as shown in FIGS. 2 and 3.

Figure 8:
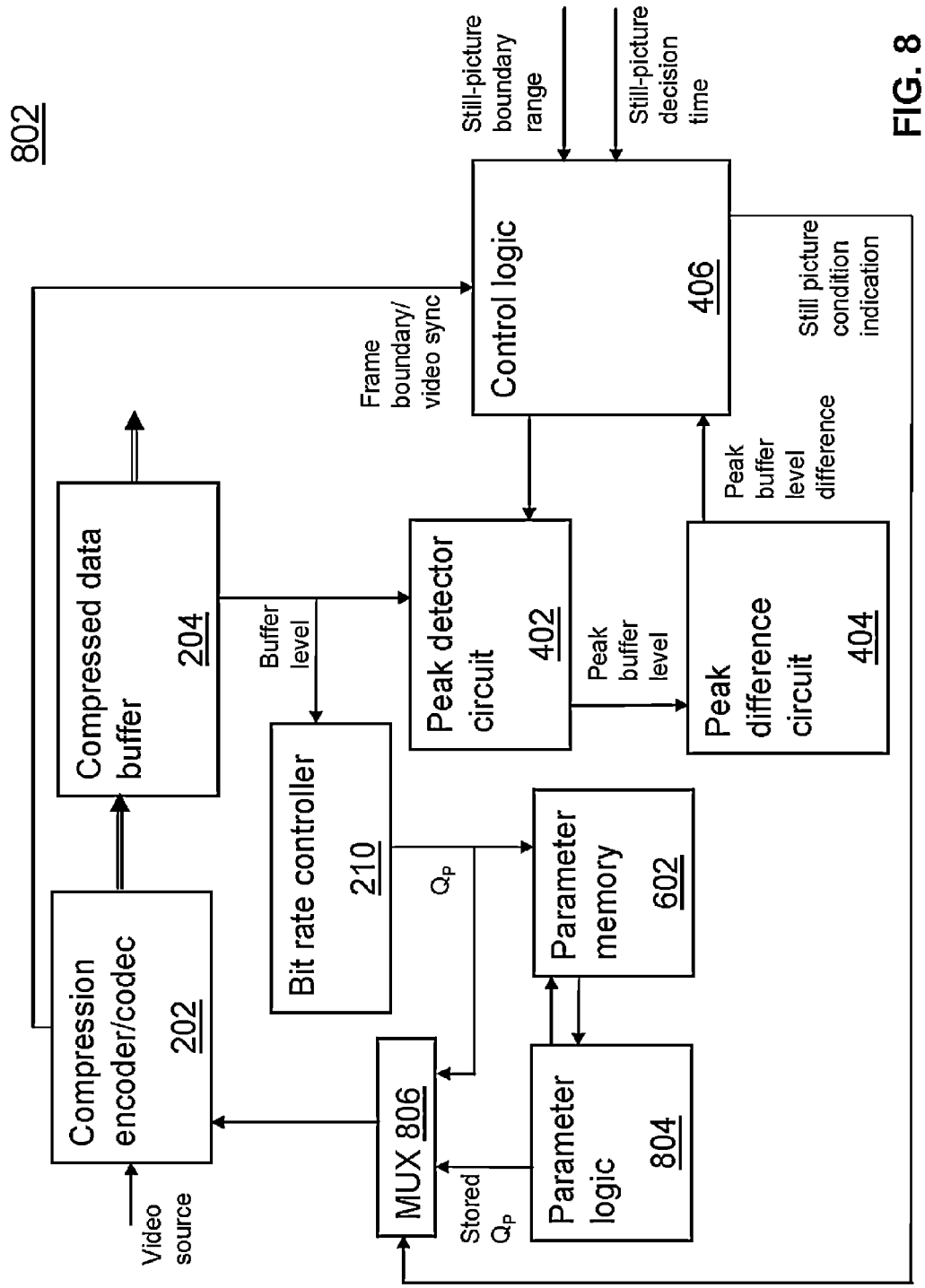
FIG. 8 is a block diagram of an additional embodiment of a system for compressing video data.

The block diagram of system 802 in FIG. 8 is similar to that of system 702 in FIG. 7, except that parameter locking logic 604 is represented by the combination of parameter logic 804 and multiplexer 806. In this embodiment, the still picture indicator signal from control logic 406 is used to select between the two $Q_P$ values entering multiplexer 806. In an embodiment, the still-picture condition indicator signal is high when a still picture is detected and low otherwise, and multiplexer 806 is configured to forward the stored $Q_P$ values from parameter logic 804 when the indicator signal is high or the $Q_{P\ values}$ from bit rate controller 210 when the indicator signal is low. As noted above the selection of $Q_P$ value may be performed by checking of a bit set to indicate the presence of the still-picture condition.

Figure 9:
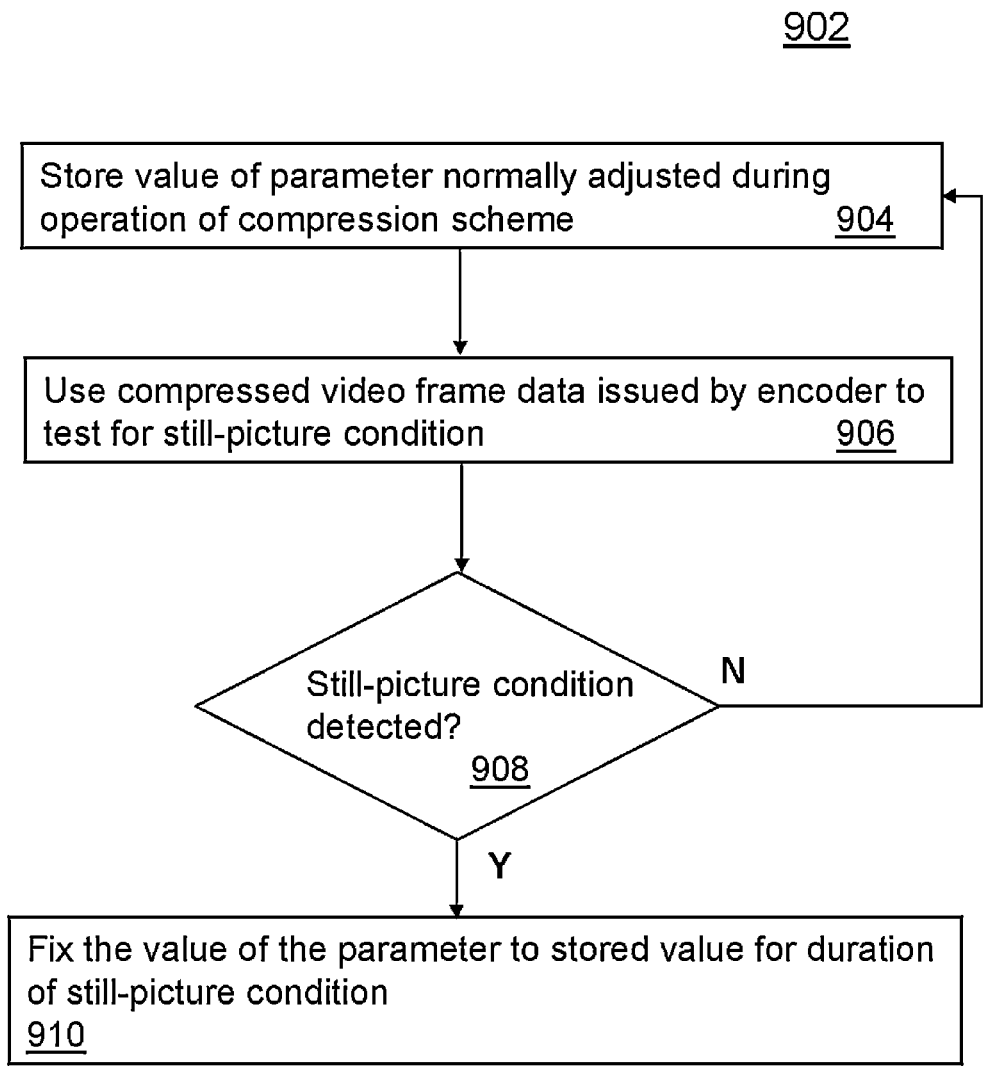
FIG. 9 is a flowchart of an embodiment of a method for modifying a video compression scheme.

FIG. 9 illustrates a method 902 of modifying a video compression scheme to reduce observed flicker. The method of FIG. 9 could be carried out by a flicker reduction circuit such as circuit 308 of FIG. 3, or by a system for compressing video data such as systems 306, 702 and 802 discussed above or by a larger device or system including such a system for compressing video or flicker reduction circuit. The embodiment of FIG. 9 includes storing the value of a parameter normally adjusted during operation of the compression scheme (step 904) and using compressed video frame data issued by a compression encoder to test for a still-picture condition (step 906). In an embodiment, the parameter normally adjusted during operation of the compression scheme is a quantization parameter. The parameter could also be a different parameter, such as an indicator of the prediction mode used for a unit of video (typically a block or macroblock) handled by the encoder.

If a still-picture condition is detected (decision block 908), the method includes fixing the value of the parameter used by the compression scheme to the stored value (step 910). If the still-picture condition is not detected, the method continues back at step 904 with storing the next value of the parameter (that obtained for the next video frame), in a loop that continues until a still-picture condition is detected. In a preferred embodiment, each storing of the parameter value for the next frame overwrites the value stored for the previous frame. The stored parameter is preferably part of a set of parameters stored for the video frame being compressed, one for each control unit (typically a macroblock or block). In the embodiment of FIG. 9, the parameter storage continues for every frame while the still-picture condition is tested, and is suspended only upon detection of a still-picture condition and fixing of the parameter value to the stored value. In an alternative embodiment, the parameter (or set of parameters) could be stored once just after the still-picture condition is detected, and that stored parameter used by the encoder for the duration of the still-picture condition.

Figure 10:
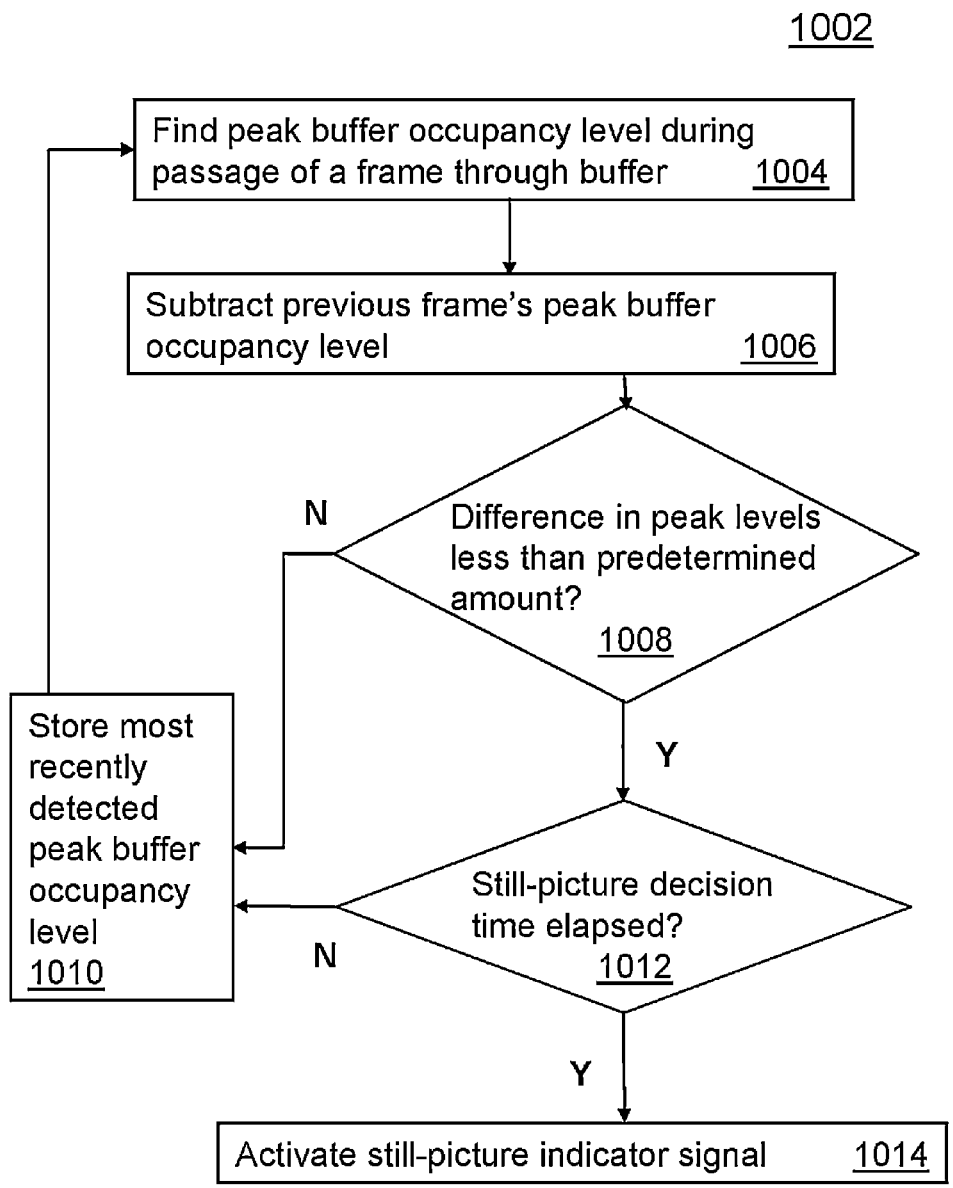
FIG. 10 is a flowchart of an embodiment of a method for detecting a still-picture condition.

FIG. 10 illustrates a method 1002 for detecting a still-picture condition. Method 1002 could be carried out by a still-picture detection circuit such as circuit 302 of FIGS. 3 and 4, or by larger circuits or systems containing a still-picture detection circuit, such as embodiments of the flicker reduction circuit and system for compressing video discussed above. The embodiment of FIG. 10 includes finding the peak occupancy level of a buffer during passage of a frame of compressed video through the buffer (step 1004). In an embodiment, the buffer is a compressed data buffer such as buffer 204 of FIG. 2. The next step in the method (step 1006) is to find the difference between the peak buffer level just obtained and a stored peak buffer level from the previous frame that passed through the buffer. This difference is compared to a predetermined amount (decision block 1008), where the predetermined amount corresponds to the still-picture boundary range, or threshold value, of FIG. 4 and the accompanying discussion above. The comparison is done in absolute value terms, by techniques known to those of ordinary skill in the art; it does not matter whether the peak buffer level moves higher or lower from one frame to the next, only the magnitude of the difference is relevant.

If the difference in the peak buffer levels is greater than the predetermined amount, the peak buffer level determined in step 1004 is stored (step 1010). In an embodiment, this peak buffer level for the most recent frame is written over the stored peak buffer level for the previous frame. The method continues back to step 1004, finding the peak buffer level for the next frame, subtracting the level of the previous frame, and comparing to the predetermined amount, until it happens that the difference in the peak buffer levels of subsequent frames is less than the predetermined amount ("yes" branch of decision block 1008).

The next step is then to check whether the still-picture decision time has elapsed (decision block 1012). As discussed in connection with FIG. 4 above, it is preferable to have a user-defined wait time to ensure that the bit rate from the encoder has stabilized before sending a still-picture activation signal that results in bit rate control being suspended. If the still-picture indicator signal is sent before bit rate control has stabilized, the parameter locking process may result in encoder parameters that cause the buffer to fill or drain too rapidly. If this happens, the still-picture condition will end, as discussed further in connection with FIG. 12 below. In an embodiment, the still-picture decision time is defined as a number of frames, and a counter is incremented for each consecutive frame in which the condition of block 1008 is met. In such an embodiment, the condition of block 1012 is checked by checking the counter value. If the decision time has not yet elapsed, the most recently determined peak buffer level is stored (step 1010), and the method continues back to step 1004, until the condition of block 1008 has been met for a sufficient number of frames (or amount of time) that the still-picture time has elapsed. If the peak buffer level difference rises above the threshold amount ("no" branch of block 1008) before the still-picture decision time elapses, any decision time counter (or frame counter) is reset to zero.

When both conditions of blocks 1008 and 1012 are met, the still picture indicator signal is activated (step 1014). The still picture indicator signal corresponds to the still picture condition indication of FIG. 4. Various alternatives and modifications to the embodiment of FIG. 10 will be recognized by those of ordinary skill in the art of data compression and transmission. For example, some provision would be made by one of ordinary skill in the art for the very first frame processed by method 1002, since in that case there would not be a peak buffer value for a previous frame. This could be handled by storing an initialization value to be used the first time through, or setting up a bypass of the subtraction and comparison steps in the case of the first frame processed. In addition, storage of the newly-determined peak buffer level (step 1010) could be done before the decisions in blocks 1008 and 1012, rather than after. In an embodiment, the peak value difference determined in step 1006 is stored each time through the loop in order to facilitate the comparison of block 1008.

Figure 11:
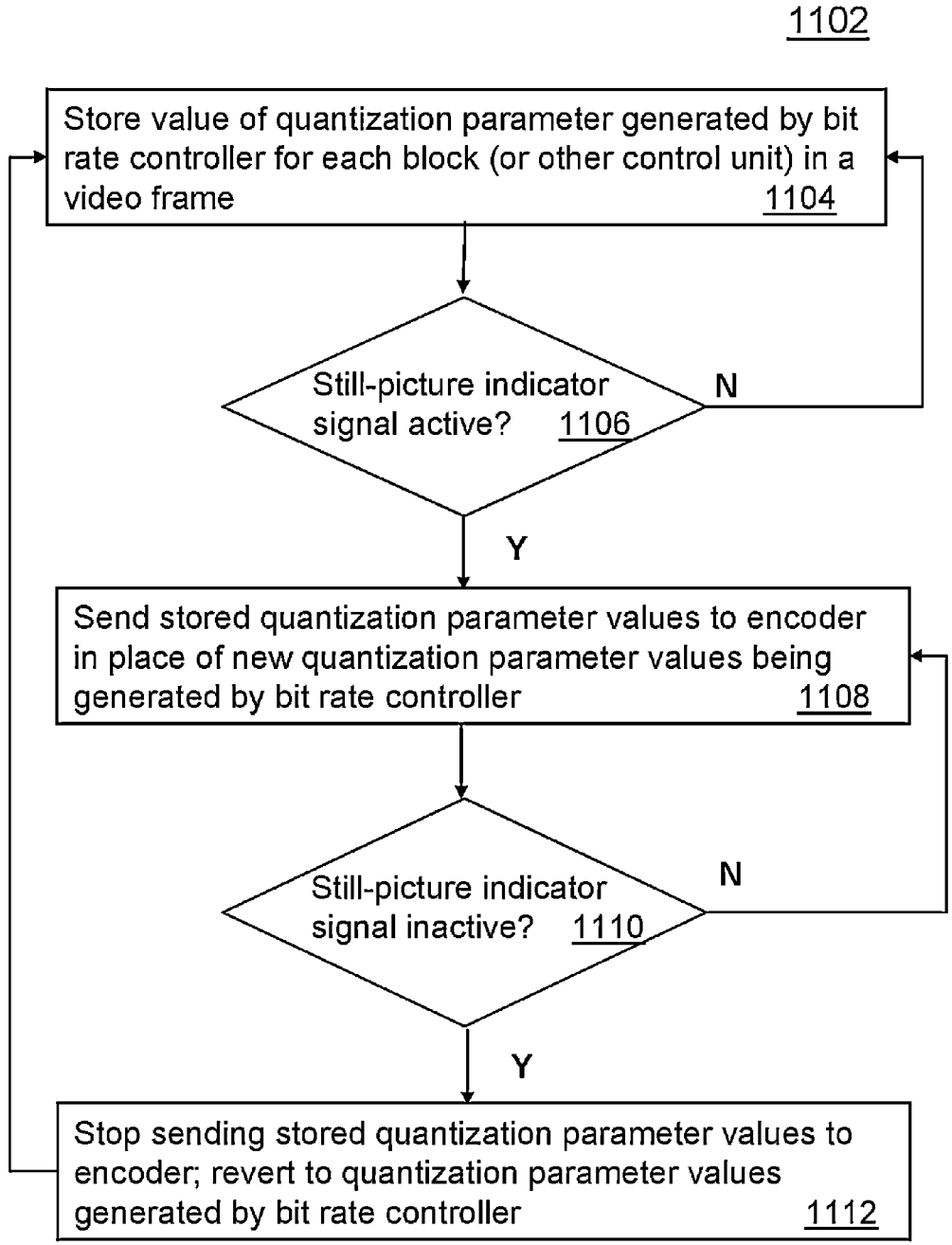
FIG. 11 is a flowchart of an additional embodiment of a method for modifying a video compression scheme.

FIG. 11 illustrates method 1102 of modifying a video compression scheme. Method 1102 could be carried out by embodiments of parameter locking circuit 304, or by larger circuits or systems containing a parameter locking circuit, such as embodiments of the flicker reduction circuit and system for compressing video discussed above. The embodiment of FIG. 11 includes storing the value of a quantization parameter generated by a bit rate controller for each block, or other control unit, in a video frame (step 1104). The quantization parameter values may be stored in a parameter memory such as memory 602 in FIG. 6. If a still-picture indicator signal is active (decision block 1106), the stored quantization parameters are sent to a compression encoder in place of new quantization parameter values being generated by the bit rate controller (step 1108). If the still-picture signal is not active, the new quantization parameter values generated by the bit rate controller for the next frame are stored (step 1104), continuing with each new frame until such time as the still-picture signal becomes active. In a preferred embodiment, the stored quantization parameter values for each new frame overwrite those for the previous frame.

As illustrated by FIG. 11, storage of new quantization parameter values is suspended once the still-picture signal becomes active and the stored quantization parameter values are sent to the encoder (step 1108). In this way, the quantization parameter values are "locked" to the values stored when the still-picture condition begins. The parameter locking is maintained only for as long as the still-picture indicator signal is active; when the signal becomes inactive, the stored quantization parameters are no longer sent to the encoder, and the quantization parameter is again supplied to the encoder by the bit rate controller (step 1112).

Various alternatives and modifications to the embodiment of FIG. 11 will be recognized by those of ordinary skill in the art of data compression and transmission. For example, the embodiment of FIG. 11 shows the stored quantization parameters being re-sent to the encoder on every trip through the loop of blocks 1108 and 1110; the stored parameters could alternatively be sent once during the still-picture condition, with the encoder adapted to re-use the same parameters unless new ones arrive. Similarly, the order of blocks 1104 and 1106 could be changed such that the quantization parameter values are stored only once just after the still-picture condition begins, rather than every time through the loop of blocks 1104 and 1106. Although the embodiment of FIG. 11 stores and "locks" the quantization parameter to effectuate flicker reduction, alternative embodiments could store and lock a different parameter, such as prediction mode, in addition to the quantization parameter or as an alternative to the quantization parameter.

Figure 12:
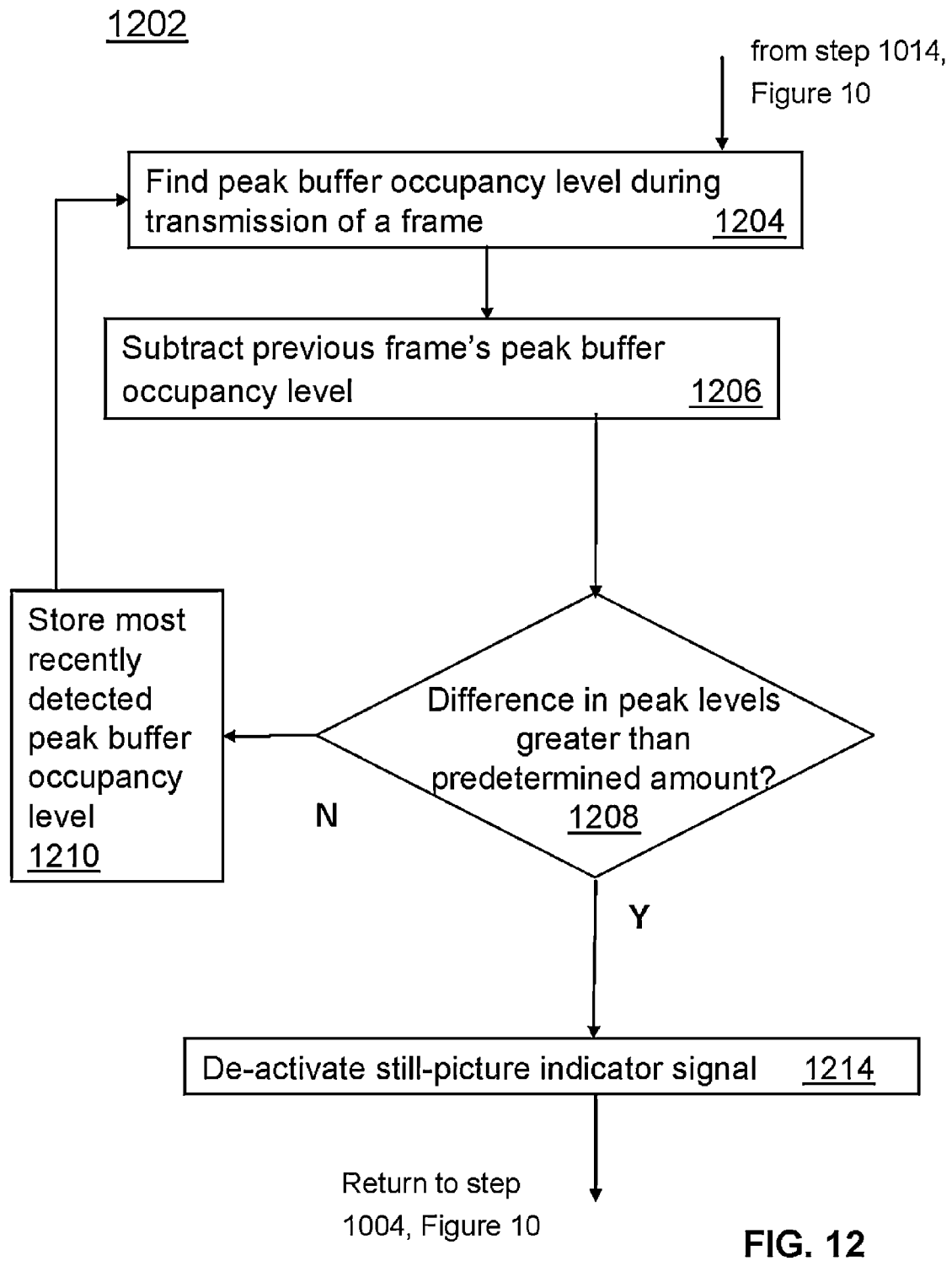
FIG. 12 is a flowchart of an embodiment of a method for detecting the end of a still-picture condition.

FIG. 12 illustrates a method 1202 for detecting the end of a still-picture condition. Method 1202 is an extension of method 1002 in FIG. 10, and like method 1002 could be carried out by a still-picture detection circuit such as circuit 302 of FIGS. 3 and 4, or by larger circuits or systems containing such a still-picture detection circuit. Method 1202 flows from step 1014 of FIG. 10, at the beginning of the still-picture condition. The peak buffer occupancy level for the current frame is then determined (step 1204), and the peak buffer level for the previous frame is subtracted (step 1206). These steps are the same as the first two steps of method 1002 of FIG. 10. Then the difference in peak levels between the two frames is compared to the predetermined threshold amount, which was also described for the method of FIG. 10. But while the comparison in FIG. 10 was to detect an in-boundary value by asking whether the peak level difference was less than the predetermined amount, the comparison in step 1208 is done to detect an out-of-boundary value by asking whether the peak level difference is greater than the predetermined amount.

If the difference in peak levels is less than the predetermined amount ("no" branch of block 1208), the still-picture condition is maintained, and the monitoring is continued by storing the most recent peak level (step 1210) and continuing to perform the loop. When the difference in peak levels becomes greater than the predetermined amount, the still-picture condition has ended, and the still-picture indicator signal is deactivated (step 1214). The method then returns to the beginning of method 1002, to again monitor for the beginning of a new still-picture condition.

By contrast with the embodiment of FIG. 10, method 1202 has no "decision time" condition to meet before deactivation of the still-picture signal. In a preferred embodiment, the still-picture signal is deactivated immediately upon detection of an out-of-boundary variation of the peak buffer level between frames. In this manner, bit rate control can be restored as quickly as possible, to avoid any possibility of buffer overflow caused by a change in image complexity or motion. Modifications and variations to the embodiment of FIG. 12 will be recognized by those of ordinary skill in the art, including applicable ones of the examples noted for the method of FIG. 10.

In some embodiments, the method, system, and circuit described herein may be implemented in hardware, software or a combination of hardware and software (i.e., firmware). FIGS. 3-8 illustrate exemplary hardware components that may be used to implement aspects of the method, system and circuit described herein. In an embodiment, circuits described herein may be implemented using a field-programmable gate array. It is noted, however, that other hardware and/or software components having substantially the same functionality may be used in place of the exemplary components shown in FIGS. 3-8 without departing from the scope of the invention. In some embodiments, circuits described herein may be integrated into a component of a video compression system or communications system, such as an encoder, codec, bit rate controller, or network interface.

Further modifications and variations of various aspects of the invention will be apparent to those skilled in the art in view of this description. For example, although embodiments described herein perform still-picture detection at the overall frame level, in alternative embodiments the peak buffer level determination and still-picture detection could be done at the level of a portion of a frame. In such an embodiment, locking of a parameter used by the encoder could be done only for certain portions of a frame, such as certain blocks, macroblocks, or slices. Storing of parameters in such an embodiment could include storing an additional indicator for each stored parameter as to whether that stored parameter (for a particular control unit) is to be sent to the encoder in the event of a still-picture condition. It is intended, therefore, that the following claims be interpreted to embrace all such modifications and variations and, accordingly, the specification and drawings are to be regarded in an illustrative rather than a restrictive sense.

What is claimed is:

1. A method for modifying a video compression scheme implemented by an encoder, said method comprising:
   storing a value of a parameter used in the video compression scheme, wherein the parameter is subject to adjustment during normal operation of the video compression scheme;
   using compressed video frame data issued by the encoder to test for a still-picture condition, in which successive compressed video frames portray a substantially unchanging image, by:
      detecting a peak occupancy level of a compressed data buffer as one frame of compressed video data passes through the compressed data buffer;
      determining a difference between detected peak buffer occupancy level and a peak buffer occupancy level detected for a previous frame of compressed video data; and
      detecting a still picture condition if the difference remains within a predetermined range throughout the passage of multiple compressed video frames through the compressed data buffer; and
   when the still-picture condition is detected, fixing the value of the parameter used in the video compression scheme to the stored value for the duration of the still-picture condition.

2. The method as recited in claim 1, wherein said still-picture condition is detected if the difference in detected peak buffer occupancy levels remains within a predetermined range of approximately 20 bytes or less throughout the passage of approximately 5 to 10 compressed video frames through the compressed data buffer.

3. The method as recited in claim 1, wherein the parameter used in the video compression scheme comprises a quantization parameter corresponding to at least one block of a video frame.

4. The method as recited in claim 1, wherein the parameter used in the video compression scheme comprises a prediction mode corresponding to at least one block of a video frame.

5. The method as recited in claim 4, wherein said storing a value of a parameter comprises storing an array including an indicator of the prediction mode corresponding to each block of a video frame.

6. The method as recited in claim 3, wherein said storing a value of a parameter comprises storing the quantization parameter corresponding to at least one block of a video frame.

7. The method as recited in claim 3, wherein said storing a value of a parameter comprises storing an array including the quantization parameter corresponding to each block of a video frame.

8. The method as recited in claim 7, wherein said storing a value further comprises storing, for each quantization parameter in the array, an indication of whether the quantization parameter for the corresponding block is to be fixed during the still-picture condition.

9. The method as recited in claim 6, wherein said fixing the value of the parameter comprises sending the stored value of the quantization parameter to the encoder implementing the video compression scheme, wherein the stored value of the quantization parameter is sent in place of the value of the quantization parameter most recently determined by a bit rate controller associated with the encoder.

10. The method as recited in claim 1, further comprising:
when the still-picture condition is detected, subsequently using the compressed video data to test for an end of the still-picture condition; and
when the end of the still-picture condition is detected, releasing the value of the parameter used in the compression scheme, thereby making the parameter again subject to adjustment through normal operation of the compression scheme.

11. A system for compressing video data for transmission over a network, said system comprising:
an encoder adapted to compress the video data;
a buffer operably coupled between the encoder and a network interface, wherein the buffer is adapted to receive the compressed video data from the encoder and make the data available to the network interface for transmission over the network;
a bit rate controller operably coupled to the encoder, and adapted to maintain a substantially constant bit rate for the transmission of the compressed video data; and
a still-picture detection circuit operably coupled to a compressed data path, wherein the compressed data path begins at the output of the encoder and extends onto the network, wherein the still-picture detection circuit comprises:
a peak buffer level detection circuit adapted to detect the peak occupancy level of the buffer as one frame of compressed video data passes through the buffer; and
a buffer peak comparison circuit adapted to determine the difference between detected peak buffer occupancy levels for successive frames of compressed video, and to detect a still picture condition if the difference is less than a predetermined amount.

12. The system as recited in claim 11, further comprising a parameter locking circuit operably coupled to the encoder and to the still-picture detection circuit, wherein the parameter locking circuit is adapted to:
store a value of a parameter used by the encoder, wherein the parameter is subject to adjustment arising from operation of the bit rate controller;
receive, if presented, a signal from the still-picture detection circuit indicating a still-picture condition wherein successive compressed video frames portray a substantially unchanging image; and
when the signal is received, fix the value of the parameter used by the encoder to the stored value of the parameter for the duration of the still-picture condition.

13. The system as recited in claim 11, further comprising:
a parameter memory operatively coupled to the bit rate controller; and
parameter locking logic operatively coupled to the buffer peak comparison circuit, the parameter memory, and the encoder, wherein the parameter locking logic is adapted to:
store in the parameter memory a quantization parameter value corresponding to at least one block of a video frame;
receive, if presented, from the buffer peak comparison circuit a signal indicating a still-picture condition; and
when the received signal indicates a still-picture condition, send the stored quantization parameter value to the encoder in place of the quantization parameter value most recently generated by the bit rate controller.

14. A flicker reduction circuit for use with a video compression encoder, said circuit comprising:
a still-picture detection circuit adapted for coupling to a compressed data path, wherein the compressed data path begins at the output of the video compression encoder and extends onto a network used for transmission of the compressed video data, and wherein the still-picture detection circuit comprises:
a peak buffer level detection circuit adapted to detect the peak occupancy level of a buffer operably coupled between the output of the video compression encoder and the network, wherein the peak occupancy level is detected for the period during which one frame of compressed video data passes through the buffer; and
a buffer peak comparison circuit adapted to determine a difference between detected peak buffer occupancy levels for successive frames of compressed video, and to detect a still picture condition if the difference is less than a predetermined amount.

15. The flicker reduction circuit as recited in claim 14, further comprising a parameter locking circuit operably coupled to the still-picture detection circuit, wherein the parameter locking circuit is adapted to:
store a value of a parameter used by the encoder, wherein the parameter is subject to adjustment arising from operation of a bit rate controller associated with the encoder;
receive, if presented, a signal from the still-picture detection circuit indicating a still-picture condition wherein successive compressed video frames portray a substantially unchanging image; and
when the signal is received, fix the value of the parameter used by the encoder to the stored value of the parameter for the duration of the still-picture condition.

16. The flicker reduction circuit as recited in claim 15, wherein the parameter locking circuit comprises:
a parameter memory adapted for coupling to the bit rate controller associated with the encoder; and
parameter locking logic operatively coupled to the still picture detection circuit and the parameter memory, wherein the parameter locking logic is adapted to:
store in the parameter memory a quantization parameter value corresponding to at least one block of a video frame;
receive, if presented, from the still-picture detection circuit a signal indicating a still-picture condition; and
when the received signal indicates a still-picture condition, send the stored quantization parameter value to the encoder in place of a quantization parameter value most recently generated by the bit rate controller.

* * * * *